United States Patent
Bonissone et al.

(10) Patent No.: US 9,709,980 B2
(45) Date of Patent: Jul. 18, 2017

(54) METHOD AND SYSTEM FOR DIAGNOSING COMPRESSORS

(76) Inventors: Piero Patrone Bonissone, Schenectady, NY (US); Xiao Hu, Shanghai (CN); David Bianucci, Prato (IT); Lorenzo Salusti, Florence (IT); Alessio Fabbri, Prato (IT); Feng Xue, Clifton Park, NY (US); Viswanath Avasarala, Schenectady, NY (US); Gianni Mochi, Scandicci (IT); Alberto Pieri, Calenzano (IT)

(*) Notice: Subject to any disclaimer, the term of this patent is extended or adjusted under 35 U.S.C. 154(b) by 1008 days.

(21) Appl. No.: 13/517,113

(22) PCT Filed: Nov. 5, 2010

(86) PCT No.: PCT/US2010/055610
§ 371 (c)(1),
(2), (4) Date: Dec. 11, 2012

(87) PCT Pub. No.: WO2011/075233
PCT Pub. Date: Jun. 23, 2011

(65) Prior Publication Data
US 2013/0211785 A1 Aug. 15, 2013

(30) Foreign Application Priority Data
Dec. 19, 2009 (IT) ............... CO2009A0068

(51) Int. Cl.
*G06F 11/30* (2006.01)
*G05B 23/02* (2006.01)

(52) U.S. Cl.
CPC ......... *G05B 23/02* (2013.01); *G05B 23/0278* (2013.01)

(58) Field of Classification Search
None
See application file for complete search history.

(56) References Cited

U.S. PATENT DOCUMENTS

| 4,385,768 A | 5/1983 | Swearingen |
| 5,203,179 A | 4/1993 | Powell et al. |
| (Continued) | | |

FOREIGN PATENT DOCUMENTS

| CN | 1688479 A | 10/2005 |
| EP | 628149 B1 | 11/1998 |
| (Continued) | | |

OTHER PUBLICATIONS

International Search Report and Written Opinion dated Dec. 21, 2010 which was issued in connection with PCT Patent Application No. PCT/US2010/055610 which was filed on Nov. 5, 2010.
(Continued)

*Primary Examiner* — Aditya Bhat
(74) *Attorney, Agent, or Firm* — GE Global Patent Operation (57) ABSTRACT

Method, system and computer software for diagnosing a compressor. The method includes generating a feature vector of the compressor, the feature vector of the compressor including components describing states of various parts of the compressor; determining, based on fuzzy constraints, an aggregated anomaly vector corresponding to the feature vector; defining rules for a preset list of possible faults/failure modes of the compressor; calculating a corroborating measure between the aggregated anomaly vector and the rules; and identifying a fault/failure mode of the compressor based on a result of the corroborating measure.

18 Claims, 7 Drawing Sheets

(56) References Cited

U.S. PATENT DOCUMENTS

| | | | |
|---|---|---|---|
| 5,284,026 A | 2/1994 | Powell et al. | |
| 5,335,507 A | 8/1994 | Powell | |
| 5,437,539 A | 8/1995 | Gysling et al. | |
| 6,748,304 B2 | 6/2004 | Felke et al. | |
| 7,352,141 B2 | 4/2008 | Kling et al. | |
| 8,862,250 B2* | 10/2014 | Ko et al. | 700/80 |
| 2003/0188740 A1 | 10/2003 | Tribelsky et al. | |
| 2006/0208673 A1 | 9/2006 | Kling et al. | |
| 2007/0198215 A1 | 8/2007 | Bonanni et al. | |
| 2008/0044702 A1 | 2/2008 | Maier et al. | |
| 2009/0037772 A1* | 2/2009 | Wegerich et al. | 714/26 |
| 2009/0300417 A1 | 12/2009 | Bonissone et al. | |

FOREIGN PATENT DOCUMENTS

| | | |
|---|---|---|
| EP | 1521152 A2 | 4/2005 |
| EP | 1717659 A1 | 11/2006 |
| GB | 2098674 A | 11/1982 |
| JP | 2002333916 A | 11/2002 |
| JP | 2005309616 A | 11/2005 |
| RU | 2364911 C2 | 8/2009 |
| WO | 9318356 A1 | 9/1993 |
| WO | 9404250 A1 | 3/1994 |
| WO | 9915255 A1 | 4/1999 |
| WO | 0183385 A2 | 11/2001 |
| WO | 2004079889 A1 | 9/2004 |
| WO | 2007098477 A2 | 8/2007 |

OTHER PUBLICATIONS

Italian Search Report and Written Opinion dated Aug. 9, 2010 which was issued in connection with Italian Patent Application No. CO2009A000068 which was filed on Dec. 19, 2009.

Unofficial English Translation of KZ Office Action dated Dec. 11, 2013 from corresponding Application No. 2012/1575.1.

Unofficial English translation of CN Office Action dated Mar. 19, 2014 issued in connection with corresponding CN Application No. 201080064239.5.

Unofficial English Translation of Japanese Office Action issued in connection with corresponding JP Application No. 2012544517 on Mar. 10, 2015.

\* cited by examiner

METHOD AND SYSTEM FOR DIAGNOSING COMPRESSORS

CROSS REFERENCE TO RELATED APPLICATIONS

This is a national stage application under 35 U.S.C. §371(c) prior-filed, co-pending PCT patent application serial number PCT/US2010/055610, filed on Nov. 5, 2010, which claims priority to Italian Patent Application No. CO2009A000068, filed on Dec. 19, 2009, the entire contents of which are incorporated herein by reference.

BACKGROUND OF THE INVENTION

Field of the Invention

Embodiments of the subject matter disclosed herein generally relate to methods and systems and, more particularly, to mechanisms and techniques for diagnosing a machine in general, and a compressor in particular.

Description of the Prior Art

Today there are a large number of machines (industrial machines as, for example, compressors) installed at various facilities and used to process oil and gas. Such machines may experience symptoms that are indicative of a fault or a failure mode. Due to the technical complexities of these machines, the user of the machine might not have the capability to address these symptoms. Thus, the manufacturer of the machines, which has the technical capability to determine the matters affecting the machine, enters into maintenance and diagnostic agreements with the user for ensuring that the machines are monitored and maintained in an adequate state of operation. For this reason, the manufacturer of the machines may have plural sensors installed at the location of the user for monitoring the "health" of the machines. The same manufacturer may have plural contracts with multiple clients.

Prognostics and Health Management (PHM) is an emerging technology to support the efficient execution of contractual service agreements (CSA) for assets such as locomotives, medical scanners, aircraft engines, turbines, and compressors. One goal of PHM is to maintain these assets' operational performance over time, improving their utilization while minimizing their maintenance cost. PHM can be used as a product differentiator, to reduce the cost of the original equipment manufacturer service during the assets' warranty period, or to more efficiently provide service under a CSA.

Figure 1:
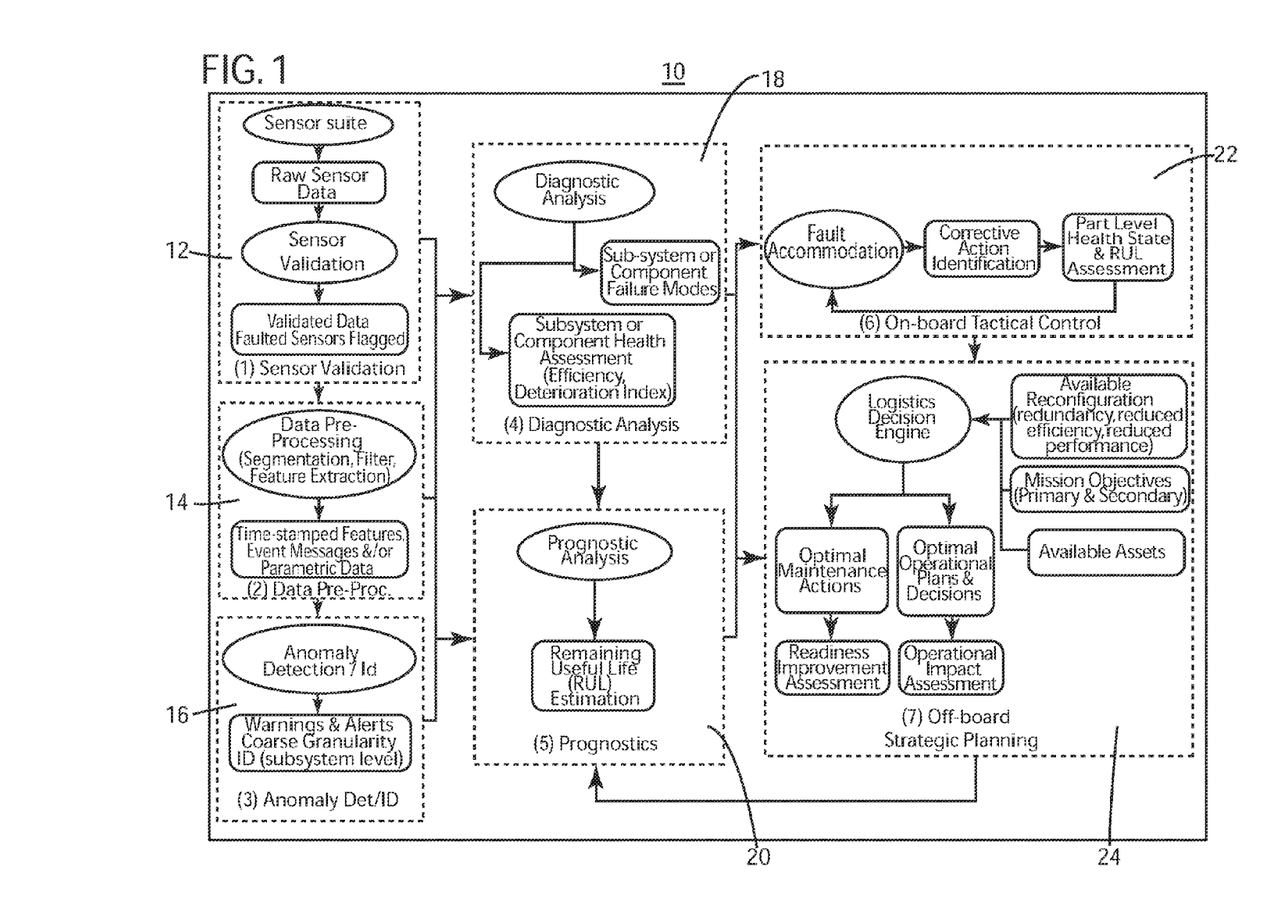
FIG. 1 is a schematic diagram of a conventional compressor diagnostic system.

FIG. 1 shows a traditional PHM system 10. According to this figure, after performing the traditional preparation tasks, such as sensor validation in a sensor validation unit 12 and input data pre-processing in a processing unit 14, the PHM system 10 performs anomaly detection and identification in unit 16, diagnostic analysis in unit 18, prognostic analysis in unit 20, fault accommodation in unit 22, and logistics decisions in unit 24. These actions are known by those skilled in the art and for this reason their detailed description is omitted herein.

The anomaly detection unit leverages unsupervised learning techniques, such as clustering. Its goal is to extract the underlying structural information from the data, define normal structures and identify departures from such normal structures. The diagnostics unit leverages supervised learning techniques, such as classification. Its goal is to extract potential signatures from the data, which could be used to recognize different faults/failure modes s. The prognostics unit produces estimates of Remaining Useful Life (RUL). Its goal is to maintain and forecast the asset health index. Originally, this index reflects the expected deterioration under normal operating conditions. Later the index is modified by the occurrence of an anomaly/failure, reflecting faster RUL reductions.

The above discussed functions are interpretations of the machine's state. These interpretations lead to an on-platform control action and an off-platform logistics, repair and planning action. The on-platform control actions are usually focused on maintaining performance or safety margins, and are performed in real-time. The off-platform maintenance/repair actions cover more complex offline decisions. They require a decision support system (DSS) performing multi-objective optimizations, exploring frontiers of corrective actions, and combining them with preference aggregations to generate the best decision tradeoffs.

However, the traditional algorithms for calculating the relevance of a determined diagnostic relative to the existent symptoms of the compressor are not always accurate and sometimes they are ambiguous. Accordingly, it would be desirable to provide systems and methods that avoid these problems and drawbacks.

BRIEF SUMMARY OF THE INVENTION

According to an exemplary embodiment, there is a method for diagnosing a compressor. The method includes generating a feature vector of the compressor, the feature vector of the compressor including components describing states of various parts of the compressor; determining, based on fuzzy constraints, an aggregated anomaly vector corresponding to the feature vector; defining rules for a preset list of possible faults/failure modes of the compressor; calculating a corroborating measure between the aggregated anomaly vector and the rules; and identifying a faults/failure modes of the compressor based on a result of the corroborating measure.

According to another exemplary embodiment, there is a system for diagnosing a compressor. The system includes an interface configured to receive measurement data about the compressor; and a processor configured to receive the measurement data. The processor is configured to generate a feature vector of the compressor based on the measurement data, the feature vector of the compressor including components describing states of various parts of the compressor, determine, based on fuzzy constraints, an aggregated anomaly vector corresponding to the feature vector, retrieve rules for a preset list of possible faults/failure modes of the compressor, calculate a corroborating measure between the aggregated anomaly vector and the rules, and identify a faults/failure modes of the compressor based on a result of the corroborating measure.

According to still another exemplary embodiment, there is a computer readable medium including computer executable instructions, where the instructions, when executed, implement a method for diagnosing a compressor. The method include generating a feature vector of the compressor, the feature vector of the compressor including components describing states of various parts of the compressor; determining, based on fuzzy constraints, an aggregated anomaly vector corresponding to the feature vector; defining rules for a preset list of possible faults/failure modes of the compressor; calculating a corroborating measure between the aggregated anomaly vector and the rules; and identifying a faults/failure modes of the compressor based on a result of the corroborating measure.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of centrifugal compressors. However, the embodiments to be discussed next are not limited to these compressors, but may be applied to other compressors or complex structures that may experience various that need to be identified.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a system is configured to receive measurements from at least one compressor, generate a feature vector of the at least one compressor, the feature vector of the compressor including components describing states of various parts of the compressor, determine, based on fuzzy constraints, an aggregated anomaly vector corresponding to the feature vector, define rules for a preset list of possible diagnostics of the compressor, calculate a corroborating measure between the aggregated anomaly vector and the rules, and identify a fault/failure mode of the compressor based on a result of the corroborating measure.

Figure 2:
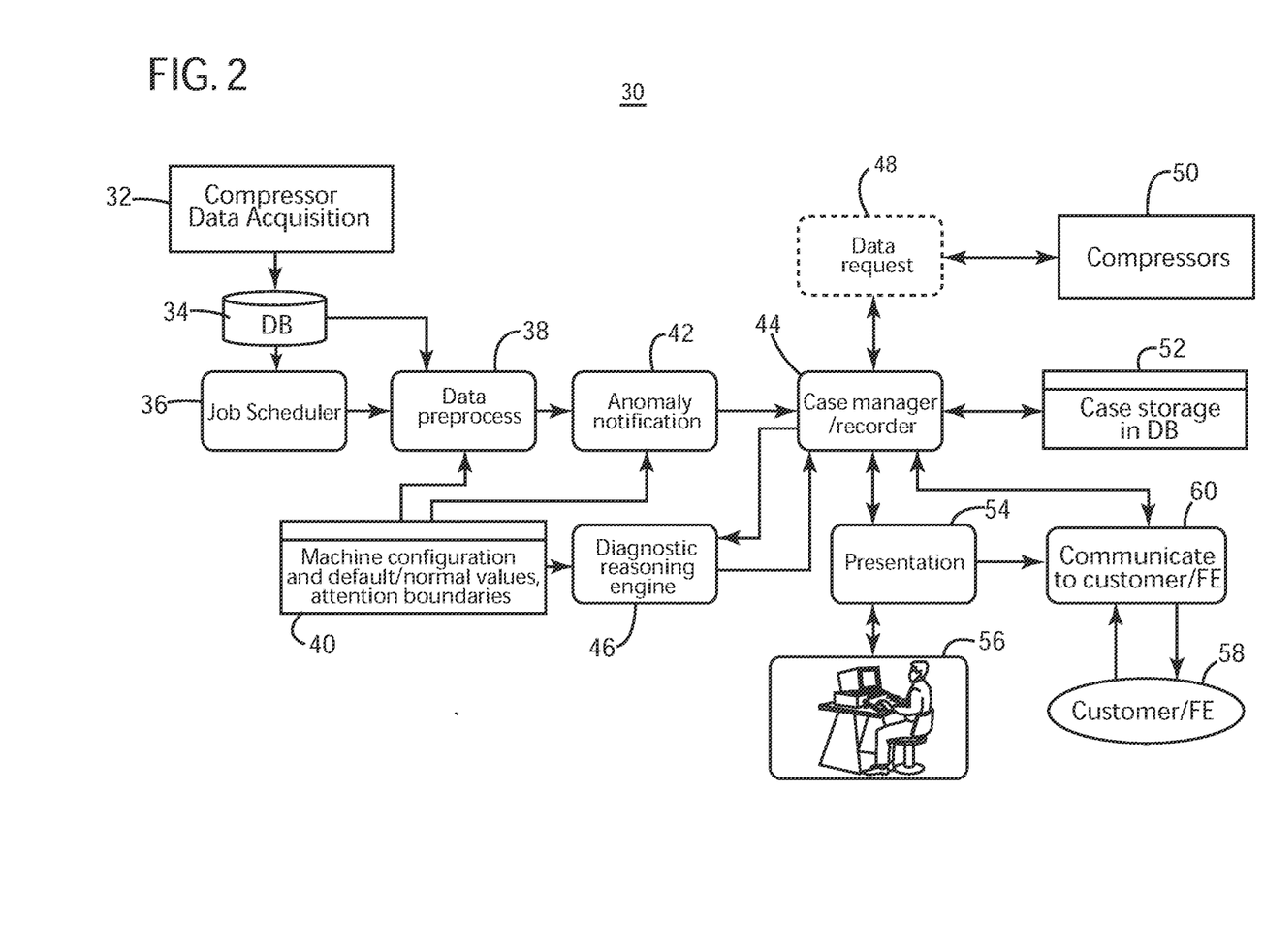
FIG. 2 is a schematic diagram of a compressor diagnostic system according to an exemplary embodiment.

Such a system 30 is shown in FIG. 2 and may be configured to monitor plural compressors. In one exemplary embodiment, the system 30 is a centralized system connected to tens if not hundredths of compressors via a data acquisition unit 32. The compressors may belong to various customers and the centralized system provides maintenance and technical support to these customers. The schematic of such a system is discussed later with regard to FIG. 7. The collected data is stored in a database 34 and the collected data may be related to various parameters of the compressors (temperatures, pressures, speed, gas composition, etc.).

A job scheduler 36 is configured to receive as input the collected data and to listen to a timer or start an application by timer. The job scheduler 36 may be configured to check sequentially and at given time intervals data received from the plurality of compressors and to determine whether an anomaly identification process should be started. The job scheduler 36 is configured to communicate with a data pre-process unit 38. The data pre-process unit 38 is configured to receive the collected data from database 34 and to perform various operations on that collected data. For example, the pre-process unit 38 may retrieve reference values for the collected data, may perform feature extractions based on predetermined algorithms, may calculate various parameters (features) of the compressor based on the collected data, etc. The calculations performed by the pre-process unit 38 may be based on a thermodynamic model of the compressor. The pre-process unit 38 may be receiving data from a machine configuration unit 40, which includes machine-specific parameters, default values of those parameters, normal values of those parameters, acceptable boundaries for those parameters, etc.

The derived features determined by the pre-process unit 38 are provided to an anomaly notification unit 42, which is configured to calculate an anomaly matrix and an anomaly vector as discussed later. The anomaly notification unit 42 is also connected to the machine configuration unit 40 and can retrieve desired data from this unit. The output from the anomaly notification unit 42 is provided to a case manager unit 44. The case manager unit 44 is configured, among other things, to open a new case for a compressor that exhibits an anomaly.

A diagnostic reasoning unit 46 is connected to the case manager unit 44 and provides the case manager unit 44 with a ranked list of possible diagnostics (fault/failure modes) for the exhibited symptoms of the compressor. The details for generating the ranked list of possible diagnostics are discussed later. In case that more data is necessary, the case manager unit 44 may request the necessary data from a data request unit 48 which is capable to communicate with compressors 50. Having the ranked list, the case manager 44 may store the data in a database 52, or may present the data, for example, via a dedicated user interface 54, to a user 56. Alternatively or in addition, the case manager 44 may present the results of the analysis to a customer 58 via a communication unit 60. Thus, the customer 58 has the opportunity to provide feedback to the case manager 44.

According to an exemplary embodiment, more details are provided about the anomaly notification unit 42. Suppose that plural sensors (not shown) are distributed on the compressors and these sensors measure various parameters of the compressors, as for example, temperatures, pressures, speeds at various locations of the compressor, etc. A vector including this data is referred herein to feature vector F. Vector F may have k components (corresponding to the measured k parameters) and each component has a time stamp, i.e., each component is associated with a time at which the corresponding parameter is measured. This vector may include data received from the job scheduler 36 as processed by the data preprocess unit 38.

Using dedicated mathematical notations for vectors and their components, the feature vector is given by $F(t)=[f_1(t), \ldots, f_k(t)]$. Each component of vector F represents a dynamic feature, as for example, a measured value, a difference between the measured value and a reference value, a percentage of a threshold, a trend of the measured parameter, etc. Components 1 to k of the feature vector F are measured and/or derived at sampling points in time. The measurements of these components are repeated at a given time interval and these measured/calculated components may be stored in a database for further processing.

According to an exemplary embodiment, the components are filtered to maintain only those components that are not in a transient mode, i.e., a steady state system is desired to be analyzed. Then, one or more components are compared to corresponding fuzzy thresholds that include two values, an attention value and a risk value. The attention value makes aware the operator that the respective parameter should be observed as the compressor may start to behave in an undesirable fashion. The risk value indicates that the compressor may be in danger of failing and measures needs to be taken to correct the parameters that are past this threshold.

Figure 3:
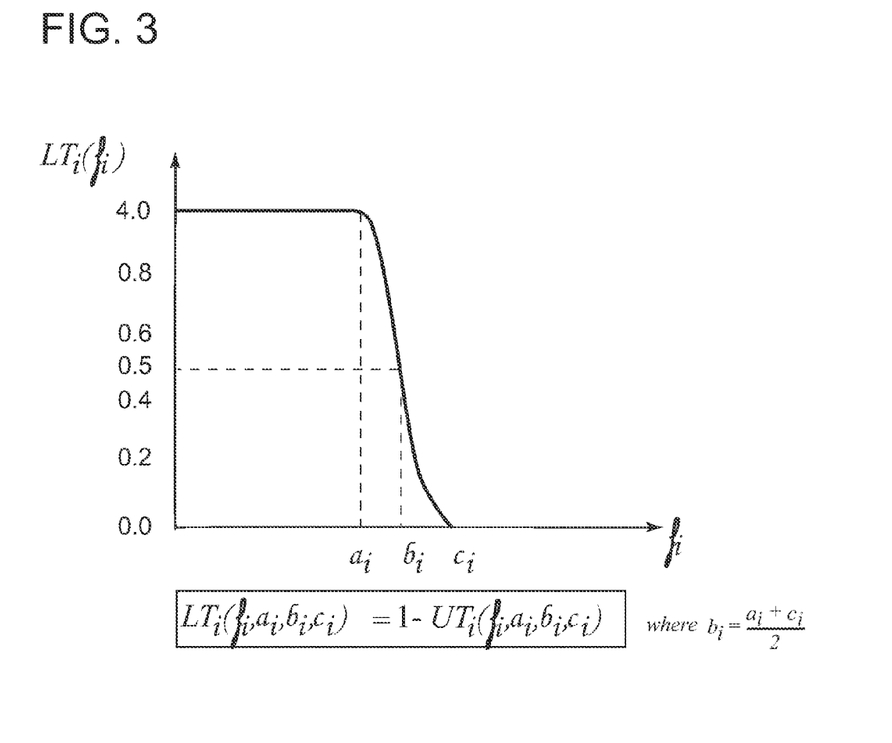
FIGS. 3 and 4 are graphs showing fuzzy thresholds according to exemplary embodiments.
Figure 4:
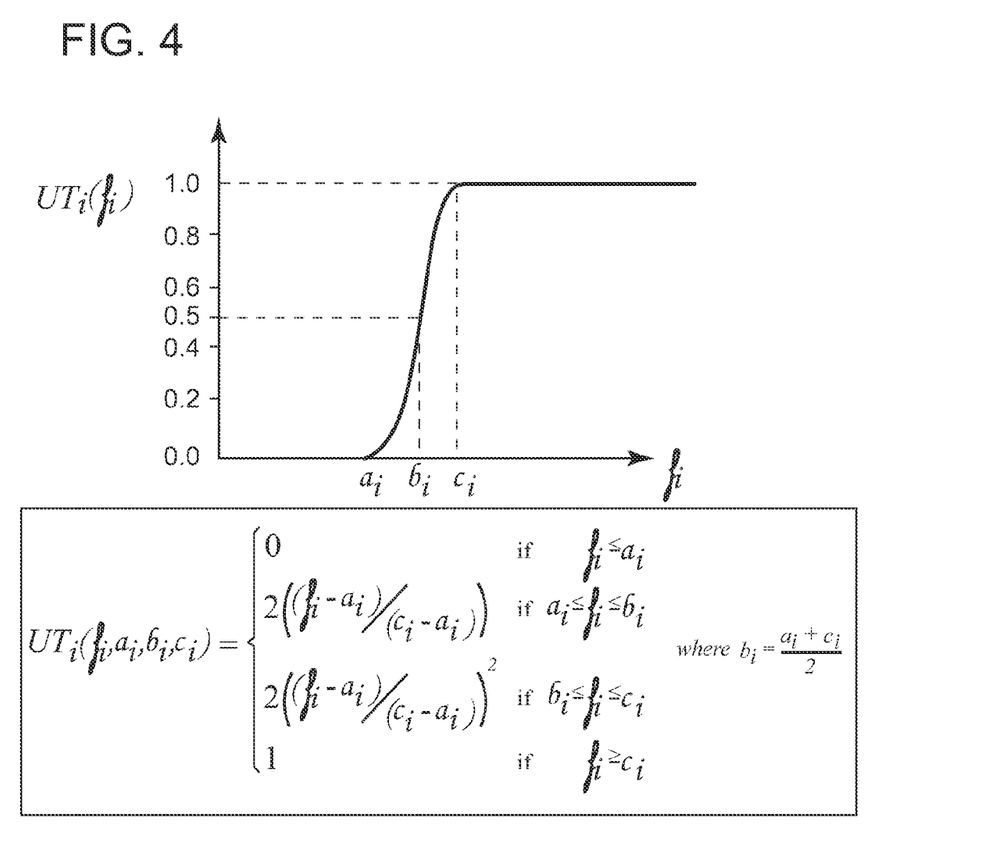

It is noted that, based on the inventors knowledge, fuzzy thresholds have not been used previously in the field of diagnosing compressors. For this reason, fuzzy thresholds are now discussed in more details. For each component $f_i(t)$ of vector F a lower threshold $LT_i(f_i)$ and/or an upper threshold $UT_i(f_i)$ can be defined to map the domain variable $f_i$ into the interval [0, 1]. For example, the lower threshold may be $LT_i(f_i):f_i \rightarrow [0,1]$ and the upper threshold may be $UT_i(f_i):f_i \rightarrow [0,1]$. FIG. 3 illustrates the lower fuzzy threshold and FIG. 4 illustrates the upper fuzzy threshold. It is noted that FIGS. 3 and 4 present specific examples of fuzzy thresholds. However, the disclosed exemplary embodiments are compatible with other fuzzy thresholds and the specific fuzzy thresholds shown in FIGS. 3 and 4 are for illustrative purposes only.

FIG. 3 shows the attention value $c_i$ and the risk value $a_i$ while FIG. 4 shows the attention value $a_i$ and the risk value $c_i$. FIG. 3 shows that a change of the parameter $f_i$ of the compressor past value zero triggers the attention value $c_i$ to be exceeded while a change of the parameter $f_i$ towards value one triggers the risk value $a_i$ to be exceeded. A similar explanation is valid for FIG. 4. As the monitored parameters $f_i$ have either an upper limit or a lower limit, the appropriate upper fuzzy threshold or the lower fuzzy threshold need to be used.

Further, it is assumed that $T_i(f_i)$ defines a generic fuzzy threshold of feature t, with the understanding that $T_i(f_i)$ is to be replaced by either $LT_i(f_i)$ or $UT_i(f_i)$ depending on a direction of the criticality. Thresholds $T_i(f_i)$ are considered to be constraints that need to be satisfied to maintain a normal operation state of the compressor. A difference between fuzzy constraints and traditional constraints is reflected in the fact that the traditional constraints are routinely step functions while the fuzzy constraints are represented by non-step functions.

The feature vector F may be considered to be a k×N matrix M, where k is the number of features and N is the number of samples of components f taken over a temporal window. A temporal window is a predetermined amount of time over which measurements of components f are taken. For simplicity, consider k=20 parameters $f_i$ of the compressor being measured every minute over a two hours temporal window. Other numbers may be used based on the compressor and needs. This data, when assembled as matrix M, has (i,j) elements and can be represented as shown in Table 1.

TABLE 1

| Features | 1 | ... | j | ... | N |
| --- | --- | --- | --- | --- | --- |
| $f_1$ | $f_1(1)$ | | $f_1(j)$ | | $f_1(N)$ |
| ... | | | | | |
| $f_i$ | $f_i(1)$ | | $f_i(j)$ | | $f_i(N)$ |
| ... | | | | | |
| $f_k$ | $f_k(1)$ | | $f_k(j)$ | | $f_k(N)$ |

By applying the thresholds $T_i(f_i)$ in vector format to the columns of matrix M, the matrix shown in Table 2 is obtained.

TABLE 2

| Constraints Evaluation | 1 | ... | j | ... | N |
| --- | --- | --- | --- | --- | --- |
| $f_1$ | 0.1 | | 0.6 | | 1 |
| ... | | | | | |
| $f_i$ | 0 | | 0.1 | | 0.5 |
| ... | | | | | |
| $f_k$ | 0 | | 0 | | 0 |

The result in Table 2 is a k×N matrix E, which indicates a degree to which each element of matrix M satisfies a corresponding normality constrain, where the constraints are the fuzzy constraints discussed above. Each element E(i, j) of matrix E is given by $E(i,j)=[T_i(M(i,j))]=[T_i(f_i(j))]$, which has values in the interval [0, 1]. A departure from zero of an element E(i, j) indicates a potential departure from normality for the corresponding parameter f. For example, matrix E in Table 2 shows that a value for parameter $f_1$ has reached the attention value at sampling point j and it reached the risk value at sampling point N.

However, due to the potential high number of sampling points, it may be desired to aggregate the numbers shown in matrix E. Thus, the degree of anomaly for each feature may be aggregated over a time window that is appropriate for the sampling rate and a time constant related to the feature. In one application, the window may have length N. More generally, the aggregation may be accomplished using a moving window over the N columns of matrix M.

An aggregation may need to be performed over the elements included in the window. One example of an aggregation may be an exponential moving average, which gives more relevance to recent values. Other known aggregation function may be used, as for example, a generalized weighted means. The result of such aggregation is a vector A, whose $i^{th}$ element indicates an overall degree of anomaly of feature $f_i$, i.e., $A(f_i)$. For example, the maximum value of the anomaly for a set of measuring times may be chosen as shown in Table 3. In another application, an average of various anomalies measured over plural measuring times may be considered as $A(f_i)$. In the exemplary embodiment shown in Table 3, after the aggregation, it is assumed that there is an anomaly in feature $f_1$ and a partial anomaly in feature $f_i$ but no anomaly in feature $f_k$. This information may be integrated with other sources of anomaly detection (for example, information encoded as error messages). While such error messages are treated as Boolean data (i.e., anomalies with strength 1), there is full visibility over the evolution of the anomaly strengths through matrix E.

TABLE 3

| Degree of anomaly |
|---|
| $A(x_1) = 1$ |
| ... |
| $A(x_i) = 0.5$ |
| ... |
| $A(x_k) = 0$ |

Schematically, the process of applying the constraints to the features $f_i$ and aggregating the anomalies is shown in Table 4.

TABLE 4

| Features | 1 | ... | j | ... | N | Constraints | Constraints Evaluation | 1 | ... | j | ... | N | Degree of anomaly |
|---|---|---|---|---|---|---|---|---|---|---|---|---|---|
| $f_1$ | $f_1(1)$ | | $f_1(j)$ | | $f_1(N)$ | $T_1(f_1)$ | $f_1$ | 0.1 | | 0.6 | | 1 | $A(f_1) = 1$ |
| ... | | | | | | ... | ... | | | | | | ... |
| $f_i$ | $f_i(1)$ | | $f_i(j)$ | | $f_i(N)$ | $T_i(f_i)$ | $f_i$ | 0 | | 0.1 | | 0.5 | $A(f_i) = 0.5$ |
| ... | | | | | | ... | ... | | | | | | ... |
| $f_k$ | $f_k(1)$ | | $f_k(j)$ | | $f_k(N)$ | $T_k(f_k)$ | $f_k$ | 0 | | 0 | | 0 | $A(f_k) = 0$ |

According to an exemplary embodiment, the diagnostic unit 46 may store or may request data regarding the compressor from an external storage unit.

TABLE 5

| | Symptom 1 | ... | Symptom k |
|---|---|---|---|
| Fault 1 | H | nil | L |
| ... | H | | L |
| Fault i | L | ic | L |

The diagnostic process may create a (partial) order over the potential fault/failure modes by matching the degree of anomaly of each feature, represented by the vector A, with the anomalies expected when a particular fault/failure mode is present. This domain knowledge is captured in the matrix shown in Table 5, in which the first column represents possible fault/failure modes and the remaining columns represent the corresponding expected degree of strength of the anomaly for the corresponding fault/failure mode. In this context, the vector of anomaly strengths A is considered as a vector of symptoms which is driving the diagnostics system. In other words, the columns in Table 5 are populated based on the experience and expectancies of the operator of the compressor with entries H, L, M, ic, or nil which stand for High, Medium, Low, Indirect Consequences and no influence. These values may be input manually by the manufacturer and/or the operator of the compressor and these values correspond to the expected anomalies and their strength when certain faults/failure modes are present in the compressor. It is noted that a given fault/failure mode may determine more than one part of the compressor to exhibit anomalies. While Table 5 includes data specific to a centrifugal compressor, other tables may include data relevant to another machines to be diagnosed.

As an example, consider that the symptoms noted in the first row of Table 5 represent the various components $f_i$, and the Fault i row is one fault/failure mode of the compressor. For such a fault/failure mode it is expected, according to this exemplary embodiment, that values for the Symptom 1 and Symptom k are L. In other words, an algorithm implemented on a microprocessor identifies the fault/failure mode Fault i with low (L) confidence if the two parameters Symptom 1 and k are outside of the threshold value and all other parameters are insignificant. It is noted that this is an example and each compressor may have its own parameters and characteristics monitored as desired.

The faults/failure modes noted in the first column of Table 5 may be identified based on rules defined for each fault/failure mode. Entries H, L, M, and is may be interpreted as the expected strengths of the symptoms for each corresponding fault/failure mode.

The matrix shown in Table 4 may be interpreted as a set of association rules having elements $Rule_i$, with $$SET = \bigcup_{i=1}^{n} Rule_i = \bigcup_{i=1}^{n} (\vec{X}_i \Rightarrow Y_i) = \bigcup_{i=1}^{n} ([x_{i,1}, x_{i,2}, \ldots, x_{i,k}] \Rightarrow Y_i)$$

where $Y_i$ is a fault/failure mode, for example, the elements listed in the first column in Table 5, and $X_i$ represents a plurality of symptoms, for example, the entries in each row in Table 5.

The anomaly vector A is matched with each fault/failure mode in the matrix and the $i^{th}$ row in the matrix of Table 5 is interpreted as the association rule $Rule_i$, where $Rule_i$ is given by $$Rule_i = (\vec{X}_i \Rightarrow Y_i) = [x_{i,1}, x_{i,2}, \ldots, x_{i,k}] \Rightarrow Y_i.$$

$\vec{X}_i$, the Left Hand Side (LHS) of association rule $Rule_i$ is given by:

$$\vec{X}_i = [x_{i,j}] = [x_{i,1}, x_{1,2}, \ldots, x_{i,k}] \text{ where } x_{i,j} \in \{H, M, L, ic, nil\}$$

and where each component $x_{i,j}$ of $X_i$ has one of five values H, M, L, ic or nil with nil being zero. It is noted that vector $X_i$ has k components and k is equal to the number of columns in Table 5 and i is the number of rows in Table 5.

For each fault/failure mode $Y_i$ (row in Table 5), the diagnostic unit 46 may be configured to compute a measure of corroborating evidence $C(Y_i, A)$ (the expected symptoms for $Y_i$ to match the anomaly vector A), and a measure of refuting evidence $R(Y_i, A)$ (lack of match between the expected symptoms for $Y_i$ and the anomaly vector A). There are multiple ways of computing these two measures. For a better understanding, exemplary functions for C and R are next discussed.

The anomaly vector, which is the input for the diagnostics process, is defined as:

$$A = [A_1, A_2, \ldots A_k] \in [0,1],$$

where each value $A_i$ has a value between zero and one.

To account for the partial match of the inputs with their corresponding references, taking into account the High (H), Medium (M), or Low (L) probability of observing that symptom, or the fact that it might be an indirect consequence (ic), the LHS of association rule $Rule_i$ may be decomposed into:

$\vec{X}_i=(H)\vec{X}_i^H\cup(M)\vec{X}_i^M\cup(L)\vec{X}_i^L\cup(ic)\vec{X}_i^{ic}\cup(nil)\vec{X}_i^{nil}$ where $\vec{X}_i^H$ is a binary indicator of the value H:

$\vec{X}_i^H = [\hat{x}_{i,j} | \hat{x}_{i,j}=1$ if $(x_{i,j}=H)$, else $\hat{x}_{i,j}=0]$, etc.

Further, a set of weights W reflecting the importance of matching inputs with the entries H, M, L, ic, nil of Table 5 is introduced as follows:

$W=\{w_H, w_M, w_L, w_{ic}, w_{nil}\}$ with W being, for example, {0.8, 0.5, 0.2, 0.1, 0.0}. Based on this example, the corroborating evidence measure C can be computed to account for the amount of evidence expected for a fault/failure mode $Y_i$ and the anomaly A. In other words, C may be the weighted, partial match between the anomaly vector A and $\vec{X}_i$, the LHS of rule Rule$_i$, as given by:

$$C(Y_i, A) = \text{Match}(\vec{X}_i, A)$$
$$= \frac{w_H \langle A, \vec{X}_i^H \rangle + w_M \langle A, \vec{X}_i^M \rangle + w_L \langle A, \vec{X}_i^L \rangle + w_{ic} \langle A, \vec{X}_i^{ic} \rangle}{w_H |X_i^H| + w_M |X_i^M| + w_L |X_i^L| + w_{ic} |X_i^{ic}|}$$

where the inner product $\langle A, \vec{X}_i^H \rangle$ is implemented using the traditional scalar product. Note that $A=[A_1, A_2, \ldots A_k]$ where $A_i \in [0,1]$, while $\vec{X}_i^H = [\hat{x}_{i,1}, \hat{x}_{i,2}, \ldots, \hat{x}_{i,k}]$ where $\hat{x}_{i,j} \in \{0,1\}$.

To exemplify the calculation of a fault/failure mode $Y_i$, the example shown in Table 6 is discussed next. Assume that the anomaly vector A has the values shown in the first row of Table 6. Also assume that the rule (a row not shown in Table 5) is given by $X_i$ as shown in the second row of Table 6. The rule $X_i$ in the second row is decomposed into subrules that correspond to the H, M, and L values as shown in the third, fourth, and fifth rows of Table 6. As no is or nil values are present for the fault/failure mode $Y_i$, corresponding rules are not shown in Table 6. While the values of anomaly vector A are calculated based on (i) measured parameters of the compressor and (ii) predetermined constraints as discussed above with regard to Tables 1-4, the rule $X_i$ is likely determined based on the experience of the operator of the compressor and/or the manufacturer of the compressor. Using the corroborating evidence measure C defined above and the weights noted above, the value 82% is determined for the fault/failure mode $Y_i$.

TABLE 6

|   | A | 1 | 0.9 | 0.8 | 0 | 0.2 | 0.5 | C($Y_i$, A) |
|---|---|---|-----|-----|---|-----|-----|-------------|
| $Y_i$ | $X_i$ | H | H | H |   | L | L |   |
|   | $X_i^H$ | 0 | 0 | 0 |   | 0 | 0 |   |
|   | $X_i^M$ | 0 | 0 | 0 |   | 1 | 1 |   |
|   | $X_i^L$ |   |   |   |   |   |   |   |
| H | 0.8 | 1 | 0.9 | 0.8 |   |   |   | 82% |
| L | 0.2 |   |   |   |   | 0.2 | 0.5 |   |

Another example that has more symptoms is shown in Table 7. Here there are symptoms with a low value L besides the high H and medium M values. The same weighting factors and the same corroborating evidence measure C are used for Table 7 to arrive at a 50.7% match between the fault/failure mode $Y_i$ and the anomaly vector A.

TABLE 7

|   | A | 1 | 0.9 | 0.8 | 0 | 0.2 | 0.5 | C($Y_i$, A) |
|---|---|---|-----|-----|---|-----|-----|-------------|
| $Y_i$ | $X_i$ |   | H |   | M | L |   |   |
|   | $X_i^H$ | 0 | 1 | 0 |   | 0 | 0 |   |
|   | $X_i^M$ | 0 | 0 | 0 | 1 | 0 | 0 |   |
|   | $X_i^L$ | 0 | 0 | 0 | 0 | 1 | 0 |   |
| H | 0.8 |   | 0.9 |   |   |   |   | 50.7% |
| L | 0.5 |   |   |   | 0 |   |   |   |
|   | 0.2 |   |   |   |   | 0.2 |   |   |

As also discussed above, it may be relevant to calculate the amount of evidence expected to see for a fault/failure mode $Y_i$ missing from anomaly vector A. A complimentary metric to C may be used, such as $R(Y_i, A)=1-C(Y_i, A)$. However, this metric R does not provide any additional information.

A better measure is to compute a discount factor based on the probability of $Y_i$ being the cause of the faults/failure modes without observing the expected symptoms. For computational simplicity it is assumed that all symptoms are independent from each other. This is equivalent to taking the negation of probabilistic sum of the missing value in each degree of anomaly (i.e., complement to one), each weighted by its corresponding weight. The probabilistic sum is one of many Triangular conorms (T-conorms) that can be used to evaluate the union, and it is defined as: $S(a,b)=a+b-a\cdot b$. Like all T-Conorms, this function is associative. This means that when there are 3 or more arguments, the function can be computed recursively, i.e., $S(a,b,c)=S(S(a,b), c)$.

For example, in the example presented in Table 6, the following missing values are present: for high strength anomaly ($W_H=0.8$) there is 0.1 in $A_2$ and 0.2 in $A_3$, and for low strength anomaly ($W_L=0.2$) there is 0.8 in $A_5$ and 0.2 in $A_6$. Based on these values, the measure of refuting evidence $R(Y_i, A)$ may be calculated as:

$S(S(S(0.8\cdot 0.1, 0.8\cdot 0.2), 0.2\cdot 0.8), 0.2\cdot 0.5)=0.415$ when $S(a,b)=a+b-a\cdot b$.

If a different T-conorm is used, such as $S(a,b)=\text{Max}(a,b)$, then the above expression becomes:

$S(S(S(0.8\cdot 0.1, 0.8\cdot 0.2), 0.2\cdot 0.8), 0.2\cdot 0.5)=0.16$.

By computing the measure of refuting evidence using the maximum operator instead of the probabilistic sum, a less drastic view of the missing information is taken.

There are many parameterized families of T-conorms known in the art. Other T-conorms would be suitable to compute the refutation measure. The selection of the most appropriate T-conorm is driven by the conservative or liberal position that is desired to be taken in grading the impact of the missing information in the overall diagnostic process. According to an exemplary embodiment, the processor in which the diagnostic method is implemented may be configured to offer the operator of the processor which function to choose for the refutation measure. As one skilled in the art would recognize, the process described above may be implemented in hardware, software or a combination thereof.

According to an exemplary embodiment, the C and R measures may be combined and an overall result may be presented as the interval formed by [C($Y_i$, A), max(C($Y_i$, A), 1−R($Y_i$, A))] or by aggregation of these two measures C and R in which 1−R($Y_i$, A) is used to discount C($Y_i$, A).

For example, with regard to the example shown in Table 6, C($Y_i$, A)=0.82, R($Y_i$, A)=0.415 (when using $S(a,b)=a+b-a\cdot b$), and 1−R($Y_i$, A)=0.585. The interval noted above is actually a point [0.82, 0.82] and the discounted score is C($Y_i$, A)·(1−R($Y_i$, A))=0.48. Using the interval or the discounted factor, it is possible to rank the potential fault/failure modes to form an ordered list based on which it is possible to suggest correcting actions for the most likely fault/failure modes.

Figure 5:
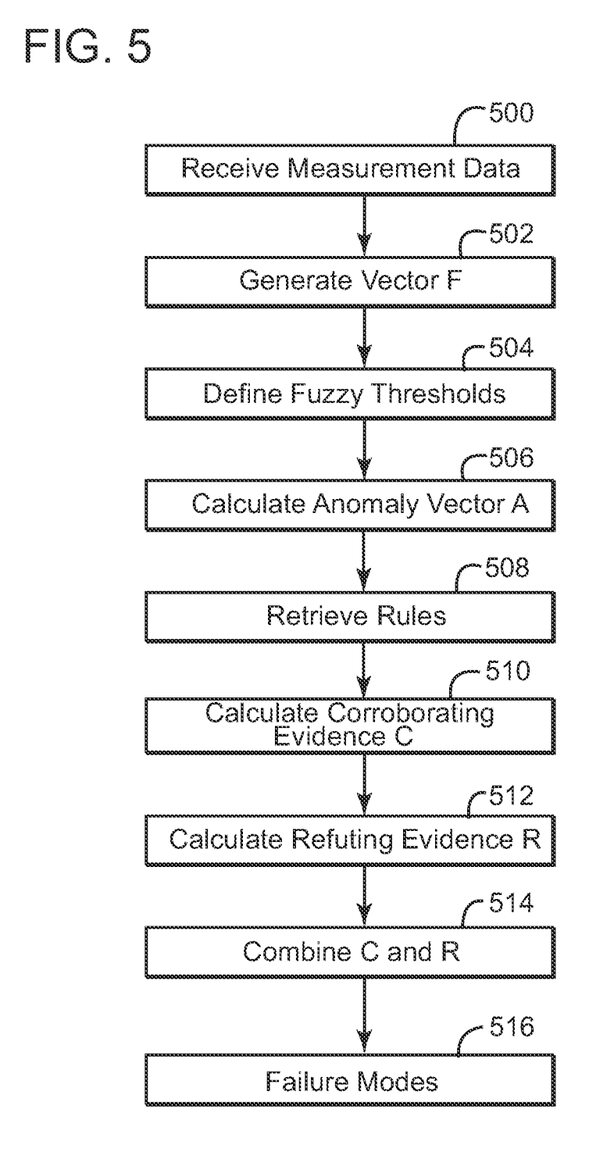
FIG. 5 is a flowchart illustrating a process for detecting faults/failure modes of a compressor according to an exemplary embodiment.

The process of detecting the fault/failure mode may be represented as shown in FIG. 5. In step 500, the processor on which the process is implemented receives measurement data. The measurement data is indicative of various parameters of the compressor. A feature vector F is generated in step 502. The feature vector F may have k components. The number of components may be changed by the operator of the compressor. Some of the components are the measured data and some other components are calculated based on the measured data. In step 504, which may be performed prior to steps 500 and 502, fuzzy thresholds as discussed above are defined for each components of the feature vector F. Depending on the situation, the fuzzy thresholds may account for an increase or decrease of the component. In one application, a combination of fuzzy thresholds and step thresholds may be used for the components of the feature vector F.

Based on the fuzzy thresholds and the feature vector F, an anomaly vector A is calculated in step 506. The procedure for calculating the anomaly vector may differ from application to application as already discussed above. A set of rules is retrieved in step 508 from a database. The set of rules is previously stored in the database or may be changed live by the operator. The set of rules maps a set of faults/failure modes to corresponding symptoms. For example, as shown in Table 5, the first column identifies plural faults/failure modes and for each fault/failure mode a set of symptoms (listed in the corresponding row) are expected. The considered symptoms are listed in the first row of Table 5 and their expectancy for a given fault/failure mode in row "n" are listed in row "n". As seen in Table 5, not all the symptoms are present for a given fault/failure mode, some have a high expectancy, some have a low expectancy and some have a presence but not directly related to the fault/failure mode. For these reasons, the expectancy to see a symptom for a given fault/failure mode is quantified as high, medium, low, null, and indirectly related. It is noted that according to an exemplary embodiment, the set of rules are manually entered by a technician who is familiar with the operation and failures of the compressor.

Based on the rules and the anomaly vector A, a corroborating evidence measure C is calculated in step 510. This measure provides a reliance about an identified fault/failure mode to correspond to detected symptoms. The measure may be expressed as a percentage, with 100% being a fully reliable result. However, according to optional step 512, a refuting evidence measure R may also be calculated and this measure indicates the lack of reliability of the identified fault/failure mode. According to another optional step 514, the two measures C and R may be combined to produce in step 516 a more reliable ranking of the possible fault/failure mode corresponding to a set of detected symptoms.

Figure 6:
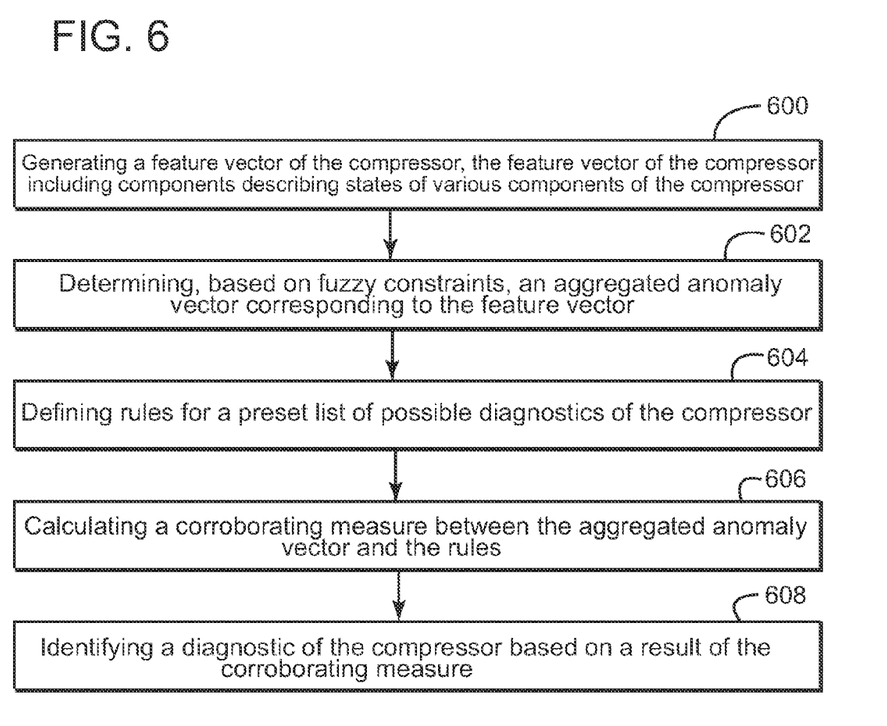
FIG. 6 is a flowchart illustrating a method for ranking various faults/failure modes of a compressor according to an exemplar embodiment.

According to an exemplary embodiment illustrated in FIG. 6, there is a method for diagnosing a compressor. The method includes a step 600 of generating a feature vector of the compressor, the feature vector of the compressor including components describing states of various components of the compressor; a step 602 of determining, based on fuzzy constraints, an aggregated anomaly vector corresponding to the feature vector; a step 604 of defining rules for a preset list of possible diagnostics of the compressor; a step 606 of calculating a corroborating measure between the aggregated anomaly vector and the rules; and a step 608 of identifying a diagnostic of the compressor based on a result of the corroborating measure.

Optional steps may include calculating a measure of refuting evidence R that quantifies an amount of evidence that is missing for a fault/failure mode, where the measure of refuting evidence R may be based on a triangular conorm function; or combining the corroborating measure C with the measure of refuting evidence R to rank each fault/failure mode of the compressor.

According to an exemplary embodiment, a system including a processor may be configured to receive values of the components of the feature vector over a predetermined time window, apply the fuzzy constraints to the components of the feature vector to determine corresponding instant anomalies at certain times during the predetermined time window, and aggregate the corresponding instant anomalies at the certain times to generate the aggregated anomaly vector for the entire predetermined time window and for all the components of the feature vector.

According to another exemplary embodiment, the processor is further configured to divide each rule into subrules, calculate a scalar product between each subrule and the aggregated anomaly vector, and determine a percentage value that is indicative of a fault/failure mode experienced by the compressor based on the calculated scalar products which form the corroborating measure.

Additionally or alternatively, the processor is further configured to use a corroborating measure C between each rule and the aggregated anomaly vector, where C is defined as $$C(Y_i, A) = \text{Match}(\vec{X_i}, A)$$
$$= \frac{w_H\langle A, \vec{X_i}^H\rangle + w_M\langle A, \vec{X_i}^M\rangle + w_L\langle A, \vec{X_i}^L\rangle + w_{ic}\langle A, \vec{X_i}^{ic}\rangle}{w_H|X_i^H| + w_M|X_i^M| + w_L|X_i^L| + w_{ic}|X_i^{ic}|}$$

with A being the aggregated anomaly vector, $Y_i$ representing a fault/failure mode, $X_i$ representing rule "i", $w_h$, $w_m$, $w_l$, and $w_{ic}$ being weighting factors, and $X_i^H$, $X_i^M$, $X_i^L$ and $X_i^{ic}$ being the subrules of rule $X_i$.

According to another exemplary embodiment, the processor is further configured to calculate a measure of refuting evidence R that quantifies an amount of evidence that is missing for a fault/failure mode, where the measure of refuting evidence R is based on a triangular conorm function. The processor may be further configured to combine the corroborating measure C with the measure of refuting evidence R to rank each fault/failure mode of the compressor.

According to an exemplary embodiment, a computer readable medium includes computer executable instructions, where the instructions, when executed, implement a method for diagnosing a compressor. The method includes generating a feature vector of the compressor, the feature vector of the compressor including components describing states of various parts of the compressor; determining, based on fuzzy constraints, an aggregated anomaly vector corresponding to the feature vector; defining rules for a preset list of possible faults/failure modes of the compressor; calculating a corroborating measure between the aggregated anomaly vector and the rules; and identifying a faults/failure mode of the compressor based on a result of the corroborating measure.

Figure 7:
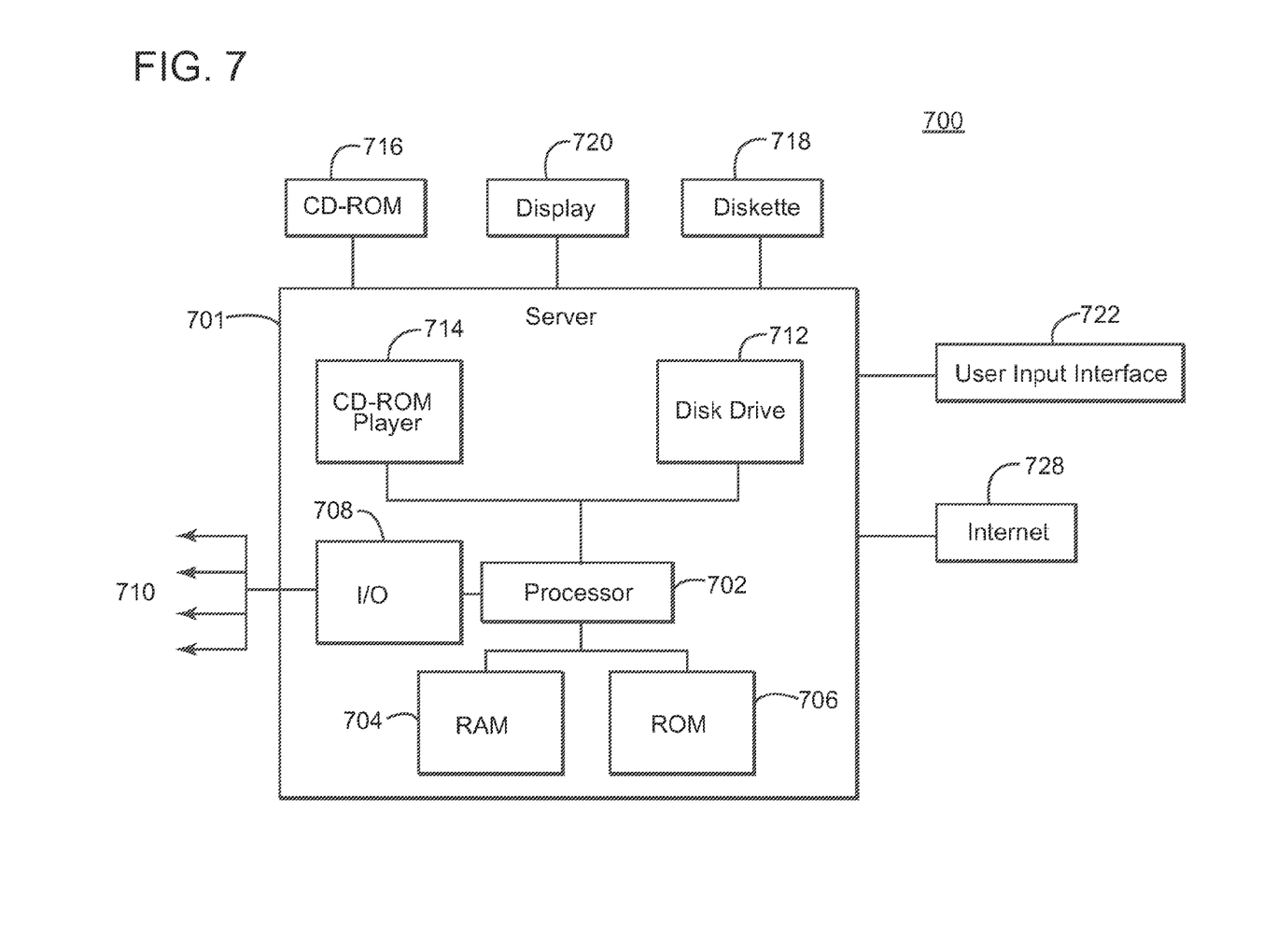
FIG. 7 is an exemplary system that can implement a method for diagnosing a compressor.

For purposes of illustration and not of limitation, an example of a representative system capable of carrying out operations in accordance with the exemplary embodiments is illustrated in FIG. 7. The processor discussed above for implementing the diagnostic process may be part of the system. Hardware, firmware, software or a combination thereof may be used to perform the various steps and operations described herein.

The exemplary system 700 suitable for performing the activities described in the exemplary embodiments may include server 701. Such a server 701 may include a central processor (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. For example, the system 700 may communicate with plural compressors for monitoring any symptoms that might appear. The plural compressors may be distributed over a large geographical area while the system 700 may be a centralized system. The processor 702 carries out a variety of functions as is known in the art, as dictated by software and/or firmware instructions.

The server 701 may also include one or more data storage devices, including hard and floppy disk drives 712, CD-ROM drives 714, and other hardware capable of reading and/or storing information such as DVD, etc. In one embodiment, software for carrying out the above discussed steps may be stored and distributed on a CD-ROM 716, diskette 718 or other form of media capable of portably storing information. These storage media may be inserted into, and read by, devices such as the CD-ROM drive 714, the disk drive 712, etc. The server 701 may be coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc. The operator of the system 700 may input any information via the interface 722, as for example, modifying the number of components of the feature vector F.

The server 701 may be coupled to other computing devices, such as the landline and/or wireless terminals and associated watcher applications, via a network. The server may be part of a larger network configuration as in a global area network (GAN) such as the Internet 728, which allows ultimate connection to the various landline and/or mobile client/watcher devices.

The disclosed exemplary embodiments provide a system, a method and a computer program product for determining a fault/failure mode of a compressor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other example are intended to be within the scope of the claims.

What is claimed is:

1. A method executed by a processor for diagnosing a compressor, the method comprising:
   measuring one or more compressor parameters comprising data of the compressor using a plurality of sensors distributed on the compressor;
   generating, by the processor, a feature vector of the compressor using the data obtained from the plurality of sensors, the feature vector of the compressor including components describing states of various parts of the compressor;
   defining, by the processor, fuzzy constraints for deviations of the components of the feature vector from reference values, wherein the fuzzy constraints are thresholds that change continuously from a low value to a high value;
   determining, by the processor, based on the fuzzy constraints, an aggregated anomaly vector corresponding to the feature vector;
   defining, by the processor, rules for a preset list of possible faults/failure modes of the compressor;
   calculating, by the processor, a corroborating measure between the aggregated anomaly vector and the rules;
   identifying, by the processor, a fault/failure mode of the compressor based on a result of the corroborating measure;
   generating a list of fault/failure modes of the compressor, wherein the list of fault/failure modes comprises a ranked, ordered list; and
   performing a corrective action based upon the generated list.

2. The method of claim 1, wherein generating a feature vector comprises:
   measuring, by the processor, first plural parameters of the compressor; and estimating, by the processor, second plural parameters of the compressor based on the first plural parameters, wherein the feature vector includes a part of the first plural parameters and the second plural parameters.

3. The method of claim 1, wherein the various parts of the compressor include bearings and a rotor, and the states include at least one of pressure, temperature, amplitude, differential pressure, mass or volumetric flow or rotor speed.

4. The method of claim 1, wherein at least one of the fuzzy constraints is defined by an attention value and a risk value, the attention value indicating that a corresponding parameter needs to be monitored as an anomaly is likely to occur, and the risk value indicating that the anomaly has occurred.

5. The method of claim 1, wherein determining an aggregated anomaly vector comprises:
receiving, by the processor, values of the components of the feature vector over a predetermined time window;
applying, by the processor, the fuzzy constraints to the components of the feature vector to determine corresponding instant anomalies at certain times during the predetermined time window; and
aggregating, by the processor, the corresponding instant anomalies at the certain times to generate the aggregated anomaly vector for the entire predetermined time window and for all the components of the feature vector.

6. The method of claim 1, wherein calculating a corroborating measure comprises:
dividing, by the processor, each rule into subrules;
calculating a scalar product between each subrule and the aggregated anomaly vector; and
determining, by the processor, a percentage value that is indicative of the fault/failure mode experienced by the compressor based on the calculated scalar products which form the corroborating measure.

7. The method of claim 6, further comprising:
using the corroborating measure C between each rule and the aggregated anomaly vector, where C is defined as $$C(Y_i, A) = \text{Match}(\vec{X}_i, A)$$
$$= \frac{w_H \langle A, \vec{X}_i^H \rangle + w_M \langle A, \vec{X}_i^M \rangle + w_L \langle A, \vec{X}_i^L \rangle + w_{ic} \langle A, \vec{X}_i^{ic} \rangle}{w_H |X_i^H| + w_M |X_i^M| + w_L |X_i^L| + w_{ic} |X_i^{ic}|}$$

with A being the aggregated anomaly vector, $Y_i$ representing the fault/failure mode, $X_i$ representing rule "i", $w_h$, $w_m$, $w_l$, and $w_{ic}$ being weighting factors, and $X_i^H$, $X_i^L$ and $X_i^{ic}$ being the subrules of rule $X_i$.

8. The method of claim 1, wherein identifying a fault/failure mode comprises:
calculating, by the processor, a measure of refuting evidence R that quantifies an amount of evidence that is missing for the fault/failure mode.

9. The method of claim 1, further comprising:
presenting, by the processor, the identified fault/failure modes to a user via a dedicated user interface.

10. The method of claim 1, further comprising:
providing the failure/fault mode to a case manager unit, wherein the case manager unit is configured to open a new case for a compressor that exhibits an anomaly.

11. The method of claim 10, further comprising:
a user providing feedback to the case manager.

12. The method of claim 1, wherein the one or more parameters comprises:
at least one of: temperature, pressure, gas composition, and/or speed at one or more location of the compressor.

13. The method of claim 1, wherein each parameter measured is associated with a time stamp.

14. The method of claim 1, further comprising determining the most likely fault/failure modes.

15. The method of claim 1, wherein the ranked, ordered list of fault/failure modes presents the fault/failure modes in the order of most likely to occur.

16. A system for diagnosing a compressor, the system comprising:
a compressor;
a plurality of sensors distributed on the compressor, wherein the plurality of sensors is configured to measure one or more compressor parameters comprising data of the compressor;
an interface configured to receive measurement data about the compressor; and
a processor configured to:
receive the measurement data and to;
generate a feature vector of the compressor based on the measurement data obtained from the plurality of sensors, the feature vector of the compressor including components describing states of various parts of the compressor;
define fuzzy constraints for deviations of the components of the feature vector from reference values, wherein the fuzzy constraints are thresholds that change continuously from a low value to a high value;
determine, based on the fuzzy constraints, an aggregated anomaly vector corresponding to the feature vector;
retrieve rules for a preset list of possible faults/failure modes of the compressor;
calculate a corroborating measure between the aggregated anomaly vector and the rules;
identify a fault/failure mode of the compressor based on a result of the corroborating measure;
generate a list of fault/failure modes of the compressor, wherein the list of fault/failure modes comprises a ranked, ordered list; and
perform a corrective action based upon the generated list.

17. The system of claim 16, further comprising:
a dedicated user interface configured to present the identified fault/failure modes to a user.

18. The system of claim 16, wherein the processor is further configured to:
provide the failure/fault mode to a case manager unit, wherein the case manager unit is configured to open a new case for a compressor that exhibits an anomaly.

* * * * *